United States Patent
Gebele et al.

(10) Patent No.: US 6,857,307 B2
(45) Date of Patent: Feb. 22, 2005

(54) METHOD AND DEVICE FOR THE DETERMINATION OF THE GAS PERMEABILITY OF A CONTAINER

(75) Inventors: Thomas Gebele, Freigericht (DE); Jürgen Henrich, Limeshain (DE)

(73) Assignee: Applied Films GmbH & Co. KG, Alzenau (DE)

(*) Notice: Subject to any disclaimer, the term of this patent is extended or adjusted under 35 U.S.C. 154(b) by 0 days.

(21) Appl. No.: 10/149,179

(22) PCT Filed: Dec. 22, 2000

(86) PCT No.: PCT/EP00/13139
§ 371 (c)(1),
(2), (4) Date: Jun. 7, 2002

(87) PCT Pub. No.: WO01/48452
PCT Pub. Date: Jul. 5, 2001

(65) Prior Publication Data
US 2002/0194899 A1 Dec. 26, 2002

(30) Foreign Application Priority Data
Dec. 23, 1999 (DE) .......................................... 199 62 303

(51) Int. Cl.⁷ ............................................... G01N 15/08
(52) U.S. Cl. ...................... 73/38; 73/38; 73/40; 73/49.3; 73/49.2; 73/52
(58) Field of Search ............................. 73/38, 40, 49.3, 73/49.2, 52, 49.2 R

(56) References Cited

U.S. PATENT DOCUMENTS

| | | | |
|---|---|---|---|
| 3,413,841 A | 12/1968 | Weber | |
| 4,593,554 A | * 6/1986 | Aarts | .......................... 73/49.3 |
| 4,951,496 A | * 8/1990 | Aarts | .......................... 73/49.3 |
| 5,333,492 A | 8/1994 | Aarts | |
| 5,750,882 A | 5/1998 | Ludtka et al. | |

FOREIGN PATENT DOCUMENTS

| | | |
|---|---|---|
| DE | 26 10 800 A1 | 10/1976 |
| DE | 195 19 975 C1 | 10/1996 |
| DE | 196 42 009 A1 | 4/1997 |
| EP | 0 741 288 A1 | 11/1996 |
| EP | 0 760 722 A | 3/1997 |

* cited by examiner

Primary Examiner—Hezron Williams
Assistant Examiner—André K. Jackson
(74) Attorney, Agent, or Firm—Fulbright & Jaworski L.L.P.

(57) ABSTRACT

The invention relates to a method and device for the determination of the gas permeability of a container, for example, a PET bottle. Said container is enclosed by a sheath, which hermetically seals the container from the environment. The intermediate space, between the container and the sheath, has only a very small volume in comparison to the volume of the container. The determination of the gas permeability is begun by bringing said intermediate space to, for example, atmospheric pressure, whilst the container is filled with a test gas by means of a special feed, until the container is at an overpressure relative to the intermediate space. The pressure in the intermediate space increases by means of the resulting diffusion of the test gas through the wall of the container into said intermediate space. The increase in pressure per unit time is a measure of the permeability of the container.

17 Claims, 2 Drawing Sheets

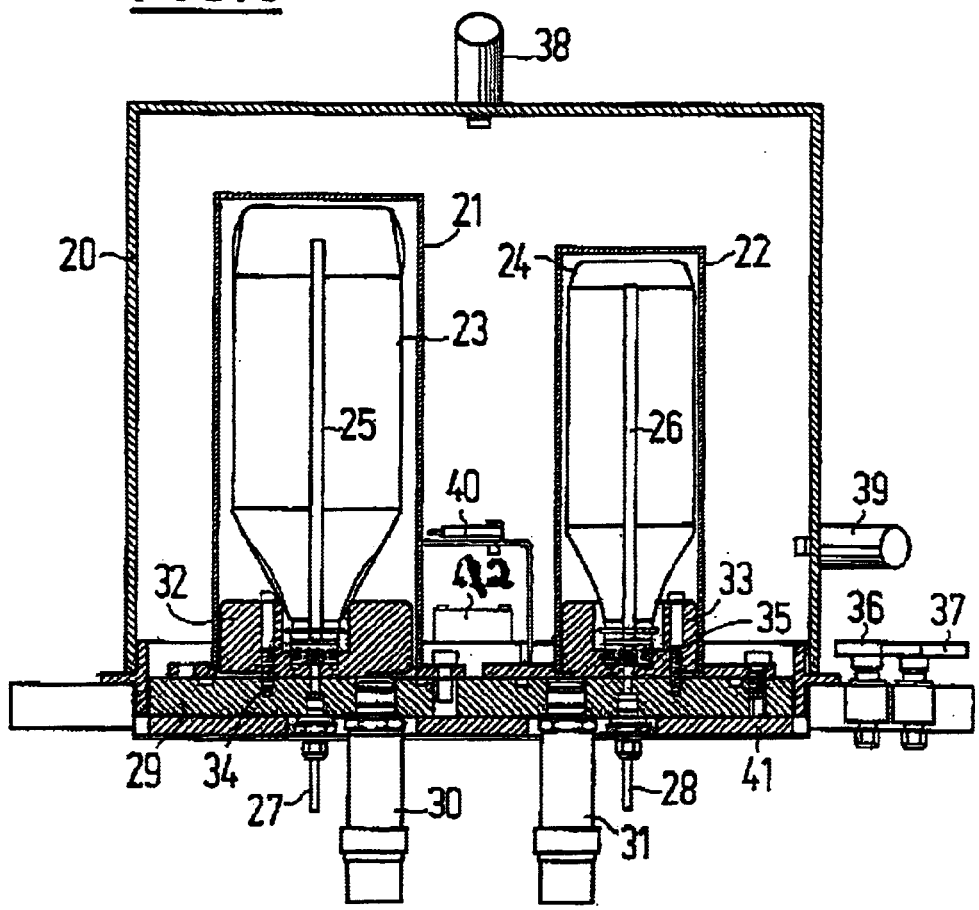
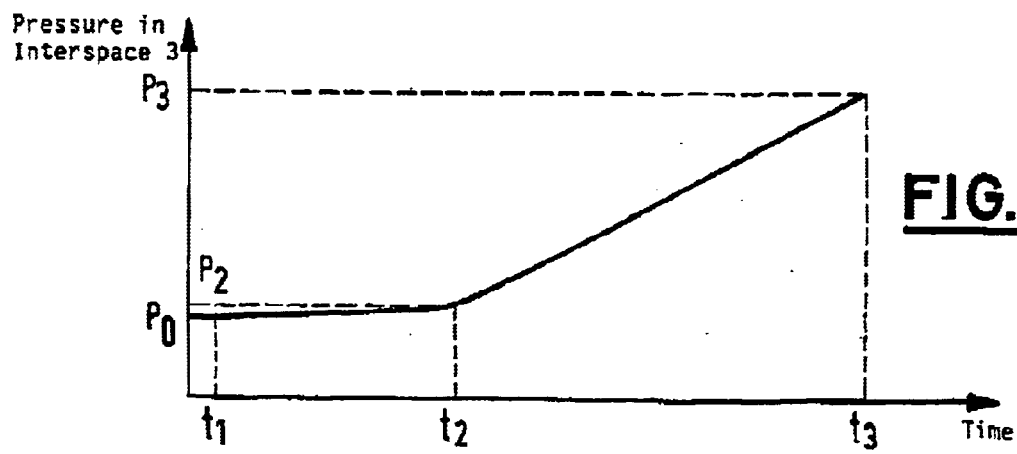

METHOD AND DEVICE FOR THE DETERMINATION OF THE GAS PERMEABILITY OF A CONTAINER

This application is a 371 of PCT/EP00/13139 filed Dec. 22, 2000.

BACKGROUND AND SUMMARY OF THE INVENTION

The invention relates to a device and a method for determining the gas permeability of a container.

Nearly all fixedly closed containers have a greater or lesser permeability with respect to gases. In particular synthetic material bottles, for example, comprised of polyethylene terephthalate (PET) tend to release gases, for example $CO_2$, to the outside if their internal pressure is greater than the external pressure. The intention is therefore to decrease the gas permeation through a coating on the inside and/or on the outside of these bottles.

In order to be able to detect the improvements attained through such coatings, it is necessary to define the gas permeability of the bottles before and after the coating. To this end, measuring instruments are required for determining the gas permeability or the permeation.

In order to inspect the tightness of a container, it is already known to generate with the aid of excess pressure in the container the diffusion of gases to the outside (Prospectus of Leybold-Heraeus GmbH, "Industrielle Dichtheitsprüfung", 1987, pp. 64, 65). In this excess pressure method the test sample is filled with a test gas or a mixture of test gas and air and provided with an encompassing enclosure of known volume. The test gas leaking out through the leaks of the test sample is concentrated in the enclosure and is measured with a sniffing probe after a defined concentration or service life.

Of disadvantage herein is that a complicated and expensive sniffing probe is applied, which includes a mass spectrometer (cf. Wutz, Adam, Walcher, Theorie und Praxis der Vakuumtechnik, Fourth Edition, 1988, pp. 466, 467). With every change of the test gas, the mass spectrometer must also be replaced every time or must be newly calibrated.

Furthermore, a method for measuring the gas permeability of the wall and/or of the closure of three-dimensional enclosure bodies is known, in which the enclosure body to be tested, which contains a gaseous filling at atmospheric pressure, is placed into a measuring chamber and the free space between the enclosure body and the inner measuring chamber is loaded up with filling bodies (DE 26 10 800). Subsequently, an underpressure is generated in the measuring chamber and the time is measured within which a certain pressure rate of ascent interval is run through, and the time required for this represents a measure of the leakage rate of the enclosure body and/or of the closure. The pressure measurement is performed with a Pirani vacuum gauge, which is a resistance manometer whose electric resistance is a function of the gas pressure. Of disadvantage in this Pirani or heat conduction measuring element is that it operates accurately only in a pressure range from 0.01 mbar to 1 mbar and inaccurately in the pressure range from 10 to 1000 mbar and has only minimal resolution for pressures greater than 100 mbar. In this method is additionally of disadvantage that in the measuring chamber an underpressure up to 0.02 Torr (=0.027 mbar=2.7 Pa) must be generated. For this purpose a vacuum pump is required.

It is furthermore known in leak detection technology to detect a leak in a test sample through an excess pressure in the test sample (Wutz, Adam, Walcher: Theorie und Praxis der Vakuumtechnik, Fourth Edition, 1988, p. 483). Herein the test sample with volume V is filled via a valve with test gas until the desired pressure $p_1$ is reached. The valve is subsequently closed and the time interval $\Delta t$ is measured within which the pressure decreases by $\Delta p_1 \ll p_1$. The total leakage rate of the test sample is in this case $$q_L = V \cdot \frac{\Delta p_1}{\Delta t}.$$

The detection sensitivity in excess pressure leak detection by measuring the pressure decrease is limited to 1 mbar·l·s$^{-1}$. However, this value can only be reached when using special difference pressure measuring instruments. Thus, in the case of this leak detection technology, an underpressure is not generated outside of the test sample but rather an excess pressure in the test sample. Since no limited and defined volume exists outside of the test sample, a pressure drop must be measured in the test sample itself. Herein is disadvantageous that with test samples with large volume it takes a long time until there is an onset of a linear pressure decrease.

The invention is based on the task of ascertaining with simple and cost-effective measuring instruments the permeation of containers, in particular of synthetic material containers.

This task is solved according to the present invention.

The invention consequently relates to a device and a method for the determination of the gas permeability of a container, for example of a bottle comprising PET. This container is therein encompassed by an enclosure which hermetically seals the container against the environment. The interspace between the container and the enclosure has a very small volume in comparison to the volume of the container. At the beginning of the determination of the gas permeability this interspace is brought to, for example, atmospheric pressure while into the container is supplied test gas via special inlet lines until this container is at an excess pressure in comparison to the interspace. Through the subsequent diffusion of the test gas through the wall of the container into the interspace, the pressure in the interspace increases. The pressure increase per unit time is a measure of the gas permeability of the container.

The advantage obtained with the invention comprises in particular that by employing simple pressure measuring instruments the permeation in the container can be ascertained independently of the gas selected in each instance as the excess pressure medium. The ascertainment of the permeation, in addition, is carried out relatively fast. Added to this is the fact that improvement of the gas impermeability by coating the container, for example by means of PVD, CVD, or PECVD methods can be detected very quickly. This is in particular of significance in the case of beverage bottles filled with $CO_2$-containing liquids. Without coating such bottles lose approximately 3% of their carbon dioxide per week. It is furthermore of advantage that the invention is not restricted to a specific test gas. Apart from $CO_2$, oxygen, helium or mixtures of gases can therefore also be utilized.

An embodiment example of the invention is depicted in the drawings and will be explained in the following in further detail.

FIG. 2 shows a curve representing the pressure increase in a container encompassing a synthetic material bottle.

FIG. 3 shows a configuration with several devices for the ascertainment of the permeation of different synthetic material bottles.

FIG. 4 shows a configuration of four devices for the ascertainment of permeation of synthetic material bottles, with the container encompassing the synthetic material bottles being removed from one device.

FIG. 5 is a representation in principle which shows the securement of a container, which is slipped over a synthetic material bottle.

FIG. 6 shows a configuration as in FIG. 4, however, with two further configurations covered with hoods.

FIG. 7 shows a complete installation with a total of three configurations, each of which comprises four devices for measuring the permeation of synthetic material bottles.

DETAILED DESCRIPTION

Figure 1:
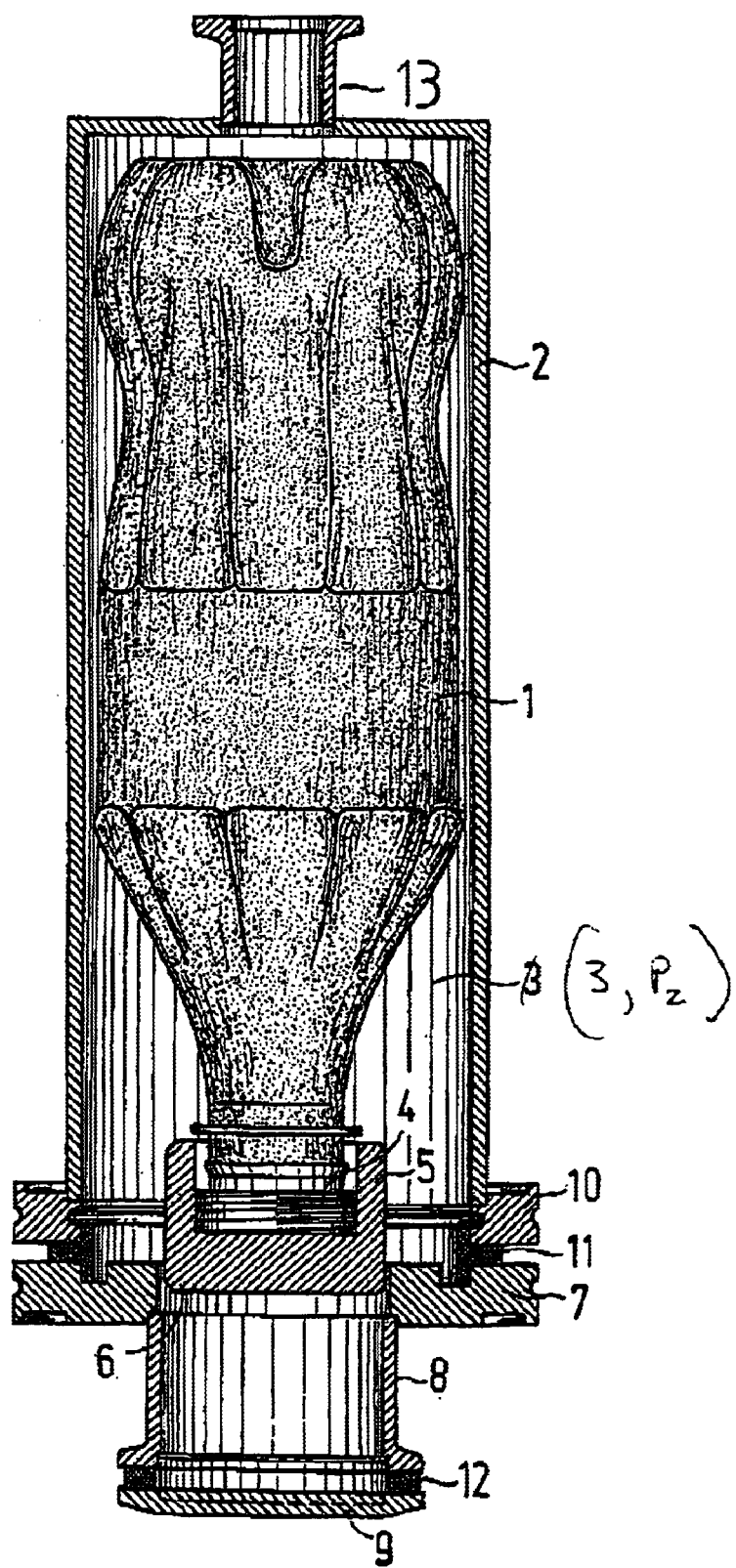
FIG. 1 shows a device for the ascertainment of the permeation of a synthetic material bottle without depiction of a pressure sensor.

In FIG. 1 a bottle 1 comprised of synthetic material is depicted standing upside down, which has a known volume $V_1$. Instead of a bottle, any other hollow body could be employed. The bottle 1 is encompassed by a pressure-tight and hermetically sealed container 2 with known volume $V_2$, the interspace 3 between the container 2 and the bottle 1 thus has the volume $V_3=V_2-V_1$. For the ratio of volumes of bottle 1 and container 2 applies $V_2-V_1<V_1$, i.e. the volume of the interspace 3 is less than the volume of bottle 1. At the start of the permeation measurement in container 2, and thus also in the interspace 3, preferably atmospheric pressure $p_0$ obtains. In contrast, in bottle 1 an excess pressure is obtained and is caused by a specific gas, for example by $CO_2$, which previously is introduced into bottle 1. Bottle 1 comprises at the end of its neck a screw threading 4 which engages a closure cap 5. Before this closure cap 5 is screwed onto bottle 1, into this bottle 1 a pressure gas is introduced, for example $CO_2$ in the form of dry ice. The closure 5 is introduced into an opening 6 of a closure cover 7 in order to close container 2. This opening 6, in turn, is closed with a cap plug 8, which comprises a cover 9. Between the closure cover 7 and a flange 10 of container 2 is provided a sealing ring 11. Similarly, between cover 9 and the cap plug 8 a sealing ring 12 is disposed. In the upper region of container 2 is provided a connecting piece 13, in which can be disposed a pressure sensor. The flange 10 is a clamping flange welded to the container 2, while the cover 9 is a blanked-off seal plate which closes off the cap plug 8 by mean of sealing ring 12.

If in bottle 1 according to definition a $CO_2$ pressure $p_{F1}$ obtains and in the interspace 3 an air pressure $p_Z$, where $p_Z$ initially corresponds to the atmospheric pressure $p_0$, and if, in addition, $p_{F1}>p_Z$, through the excess pressure obtaining in bottle 1 initially the wall of the bottle 1 comprised of synthetic material is saturated with $CO_2$ before $CO_2$ enters the interspace 3. In the case of a PET bottle having a wall thickness of 0.25 mm, a weight of 28 g, a volume of 0.5 l and the test gas $CO_2$, this saturation process takes approximately 12 to 24 hours.

The pressure in the interspace therefore assumes the course depicted in FIG. 2, i.e. during a time $t_2-t_1$ it remains nearly constant, i.e. at value $p_Z=p_0$, and subsequently starting at $t_2$ increases nearly linearly to the value $p_3$. If, before it is introduced into container 2, the bottle 1 is exposed for time $t_2-t_1$ to the internal pressure $p_{F1}$, the horizontal section of the curve depicted in FIG. 2 is absent, and the nearly linear curve rate of ascent, which is characterized in FIG. 2 by the interval $t_3-t_2$, starts immediately. With the specified data of a PET bottle, the time segment $t_3-t_2$ is approximately 24 to 72 hours.

While the pressure in interspace 3 increases linearly or quasi-linearly during the time period $t_3-t_2$, the pressure in bottle 1 decreases correspondingly. As already explained above, the total leakage rate of a test sample, here of bottle 1, is $q_L=V\cdot\Delta p_1/\Delta t$. This definition of the total leakage rate refers to the internal pressure of a test sample, with the external pressure being constant and, for example, is always atmospheric pressure which is due to the fact that no container 2 is provided.

In the configuration according to FIG. 1 such conditions do not obtain, since the pressure in interspace 3 increases continuously. The permeation through bottle 1 ends if the pressure in bottle 1 is equal to the pressure in interspace 3, thus the condition $p_{F1}-\Delta p_{F1}=p_Z+\Delta p_Z$ obtains. Consequently, at the end of the permeation no atmospheric pressure develops in bottle 1, as would be the case in the absence of container 2.

In bottle 1, which according to assumption is only filled with $CO_2$ no partial pressures are present. In contrast, the total pressure in interspace 3 is only comprised of partial pressures, which are caused by the different gas components in interspace 3 (Dalton's law). For the present invention, however, only the total pressures are of importance. In contrast to the known ascertainment of the total leakage rate, in which the pressure changes in bottle 1 are ascertained, according to the invention the pressure course in interspace 3 is ascertained. Compared to the measurement of the pressure course in bottle 1, measurement of the pressure course in interspace 3 has the advantage that the measurements can be carried out at a low pressure level, for example 1000 mbar, instead of 4000 to 6000 mbar, and thus a pressure sensor can be applied with a smaller measuring range, for example 0 to 1500 mbar, which, at given resolution, for example 0.25% of the full-scale deflection, supplies a markedly higher resolution than, for example, a pressure sensor for the pressure range from, for example, 0 to 7500 mbar. As pressure measuring instruments are herein possible for example such, in which a mechanical or piezo-electric diaphragm, due to the pressure acting onto one of its sides, causes the deflection of the diaphragm, which represents a measure of the pressure.

As a measure for the permeation P the quantity $$P = V_3 \cdot \frac{p_3 - p_2}{t_3 - t_2}$$

can be drawn on, where $p_3$ is the pressure in interspace 3 at time $t_3$ and $p_2$ the pressure in the interspace at time $t_2$.

The time period $t_2-t_1$, i.e. the time required until test gas $CO_2$ penetrates through the bottle wall, as already stated, for a synthetic material bottle comprised of PET, is approximately 12 to 24 hours, while time $t_3-t_2$ from the pressure rate of ascent in the interspace 3 to the state $p_3$ for the same material is 24 to 72 hours.

If the volume of interspace 3 is large in comparison to the volume of bottle 1, it requires a relatively long time until the pressure in the interspace increases, since a large volume is fed through the permeation from a small volume. It is therefore advantageous to keep the interspace 3 as small as possible relative to the volume of bottle 1. For this purpose volume displacers can be introduced into interspace 3. It is also possible to provide the inner wall of the container with ribbings on which the outer wall of bottle 1 abuts. Hereby it is simultaneously prevented that bottle 1 under excess pressure bulges out or bursts.

The permeation P defined here refers to the interspace 3. But it correlates with the total leakage rate $q_L$ known from the literature, as becomes evident based on the following consideration: Since for ideal gases in all pressure and temperature ranges the quotient pV/T is constant, for the content of bottle 1 applies $p_{F1}(t) \cdot V_{F1}/T = K_1$ and for the content of the interspace $p_Z(t) \cdot V_Z/T = K_2$. Thus, while the pressure in bottle 1 and in interspace 3 is a function of time, the volumes of bottle 1 and interspace 3 remain constant. Consequently, at identical temperature applies:

$$\frac{p_{F1}(t) \cdot V_{F1} \cdot T}{T \cdot p_Z(t) \cdot V_Z} = \frac{K_1}{K_2} = K_3$$

The ratio of $V_{F1}$ to $V_Z$ is also a constant, such that $$\frac{p_{F1}(t)}{p_Z(t)} = K_4 \text{ applies}$$

or $$p_{F1}(t) = p_Z(t) \cdot K_4,$$

i.e. the pressure in the bottle and the pressure in the interspace are linearly related—at least in the case of ideal gases and neglecting wall saturation phenomena. This means that the permeation is proportional to the total leakage rate $q_L$.

If the course of the wall saturation with gas, as is characterized principally by the time span $t_2-t_1$, is to be acquired more closely, it is also possible to set a pressure measuring instrument into the bottle itself. This pressure measuring instrument would be utilized, on the one hand, for controlling the filling process and determining the filling pressure, while, on the other hand, it would measure the pressure course in the bottle itself corresponding to the time spans $t_2-t_1$ and $t_3-t_2$ of FIG. 2. As measurements show, this pressure course is not a quasi-straight curve as is the curve segment $t_2-t_1$ and $t_3-t_2$ in FIG. 2, but rather a curvilinear curve, in which a marked transition as at point $t_2$ of FIG. 2 is not present. This circumstance contributes to the fact that a measuring of the internal pressure of the bottle permits less precise statements about the permeation proper of a bottle. The emisssion of the gas, which is relatively sudden from the aspect of the interspace, after the bottle wall has been loaded up with gas, has no correspondence from the aspect of the interior bottle measurements, since the mass flows are different. If, however, the saturation state has been reached, the mass flows inside and outside of the bottle are of equal magnitude. The behavior of a synthetic material until saturation is in many cases of significance. Thus, it is important to know which gas quantity is necessary for saturation of the bottle wall or of the entire container at set pressure relations and set temperature.

In FIG. 3 a portion of an installation is depicted, with which the permeations of several bottles or other containers can be determined. 20 denotes a cover hood, which is slipped over overall four housings, of which only two housings 21, 22 are evident in FIG. 3. In this housing 21, 22 one bottle 23, 24 each is disposed, of which the bottle 23 has a content of for example 1000 ml and the bottle 24 for example 500 ml. Into each of these bottles 23, 24 projects one flushing tube 25, 26 for test gas, for example carbon dioxide, connected with a gas inlet line 27, 28. Between the gas inlet lines 27, 28 and the flushing tubes 25, 26 is provided a heating plate 29, into which the ends of pressure sensors 30, 31 are set. The pressure sensors are preferably so-called absolute pressure sensors with preferably internally disposed diaphragms which at an ambient pressure of approximately 1000 mbar indicate the pressure to be measured. Such absolute pressure sensors comprise an encapsulated reference volume, such that external air pressure fluctuations during the measurement cannot exert any effect onto the measured pressure values. Air pressure changes before the start of the measurement change only the starting value of the measurement, which is without significance for the calculation of the slope of the pressure over time. Pressure sensors which are suitable for the described purposes, are for example available on the market as piezoresistive or thin-film sensors (cf. IMT-Sensor 3248 by IMT Industrie-Meβtechnik GmbH, 60439 Frankfurt). Instead of absolute pressure sensors, sensors with negative or positive excess pressure can also be employed. Above these pressure sensors 30, 31 are disposed threaded sockets 32, 33, into which threads 34, 35 of bottles 23, 24 are screwed. The gas supplied to the bottles 23, 24 via the flushing tubes 25, 26 can be controlled via valves 36, 37. From these valves 36, 37 connection lines (not shown) lead to gas bottles, which are accommodated in a cabinet, which will be represented later, or outside of this cabinet. Via these valves 36, 37 the gas flow to the gas inlet lines 27, 28 is controlled. The cover hood 20 can be raised or placed on with the aid of handles 38, 39. 40 denotes a mounting for a resistance thermometer, with which the temperature in the container 21 is measured. This temperature serves for regulating a heater realized by a heating plate 41. This heating plate is disposed beneath a base plate 29. To avoid local hot spots, a ventilator 42 is provided which circulates the air within the cover hood.

FIG. 4 depicts a configuration of three housings 50, 51, 52, each of which encompass a synthetic material bottle, not visible, as well as a synthetic material bottle 53 without housing. With this configuration it is possible to ascertain the permeation of four synthetic material bottles simultaneously. The housings 50 to 52 and bottle 53 are located within a frame 54, which serves for receiving a cover hood. In front of this frame are disposed four stop cocks 55 to 58 as well as two filling valve switches 59, 60. The stop cocks 55 to 58 only have the task of hermetically regulating off the interior bottle volume, as otherwise for example cap 5 in FIG. 1. The filling valve switches 59, 60, in contrast, are control valves, with which the operating person by pressure onto switches 59, 60 can fill or empty the bottles. It is understood that herein the stop cocks 55 to 58 must be open. The operating person consequently has the option of filling single or several bottles simultaneously. With the simultaneous filling of several bottles, which is the rule, an exactly equal internal pressure can be attained in all bottles.

Housings 50 to 52 comprise at their lower end an annular plate 61 to 63, with which they can be fastened within the frame 54.

FIG. 5 shows in detail the securement. In the left representation of FIG. 5 a housing 50 is shown with its annular plate 61 in a position before the securement with a base 66. In plate 61 are provided three bores 67, 68, 69, each of which has a narrowing. To these bores 67, 68, 69 correspond pins 70, 71, which comprise a shaft 72, 73 and a head 74, 75 on the base 66. In order to secure the housing 50 on base 66, bores 67, 68, 69 are slipped over the corresponding pins 70, 71. Subsequently the housing 50 is rotated relative to pins 70, 71 such that shafts 72, 73 move into the narrowings of bores 67 to 69. Since the heads 74, 75 of pins 70, 71 are wider than these narrowings, the housing sits firmly on the base. The representation on the right side of FIG. 5 shows the housing 50 in the arrested position.

FIG. 6 shows in its center a configuration as FIG. 4. To the right and left of this configuration is disposed in each instance a hood 80, 81 with two handles 82, 83 or 84, 85 each. Beneath each of these hoods 80, 81 are located four measuring configurations with containers and bottles. Hoods 80, 81 with the measuring configurations are disposed on a cabinet 90 depicted only partially.

In FIG. 7 this cabinet 90 is shown completely. It comprises two doors 91, 92, a latching 93 and four legs, of which only three legs 94, 95, 96 are evident in FIG. 7.

The housings 50 to 52 or the bottle 53 depicted in FIG. 6 are not evident in FIG. 7 since a hood 100 with two handles 101, 102 is slipped over them. In front of the hood 80, 81, 100 are disposed in each instance four gas valve switches 103 to 106, 107 to 110 and 111 to 114.

Next to the cabinet is disposed a monitor 115 with a computer 116, which is supported by a vertical arm 117, which, in turn, is swivellable about a rotational axis of a horizontal arm 118. This horizontal arm 118 can be connected with the cabinet 90.

Permeation determination with the aid of the device depicted in FIG. 3 and 7 takes place such that with the hood 20 removed and the housing 21, 22 removed, first the bottles 23, 24 with their open end are slid over the flushing tubes 25, 26 and screwed into the threaded screw sockets 32, 33. The containers 21, 22 are subsequently slipped over bottles 23, 24 and sealed hermetically at their open ends. Hereupon by pressure onto buttons 59, 60 and via gas inlet lines 27, 28 gas is introduced into bottles 23, 24 until a set pressure is developed. This pressure is markedly higher than the pressure obtaining between a container 21, 22 and a bottle 23, 24. Although the bottles 23, 24 are filled exclusively with a gas, it should be pointed out that the invention is also applicable with bottles or other containers, which are filled with a gas-containing liquid.

The pressure obtaining between a container 21, 22 and a bottle 23, 24 is preferably atmospheric pressure. However, a different pressure can also be set. After the preset pressure has been reached in the bottles 23, 24, the gas inlet lines 27, 28 are closed by means of the stop cocks 55 to 58. After a constant temperature in housing 20 and containers 21, 22 has been reached, the initial pressure $p_0$ in the interspace 3 measured by means of the pressure sensors 30, 31, remains nearly constant up to a time $t_2$ and subsequently increases relatively steeply. This rate of ascent can be acquired for example thereby that the pressure is measured at specific short time intervals and compared with the particular pressure measured previously. During the time period $t_2-t_1$ the pressure difference determined thereby is very small. However, after time $t_2$ this pressure difference increases steeply. If previously a specific pressure difference has been defined as a threshold value, and if this threshold value is exceeded, reaching the break point at site $t_2$ can automatically be ascertained. The pressure differences occurring within set time periods, are subsequently measured.

These pressure differences are divided by the time interval within which they have developed, and the resulting quotient is multiplied by the volume of the interspace 3. The obtained value represents the permeation rate.

In the case of expandable bottles and at very high pressures in these bottles, the measurement of the absolute permeation rate is slightly falsified thereby that the volumes in the bottle and in the interspace between container and bottle are not constant. Rather, the volume of the bottle increases with increasing pressure while the volume in the interspace decreases. However, it is possible to ascertain the ratios of the volumes as a function of the particular pressures in calibration measurements and to take them into account with the values measured later.

In the principal application of the invention, namely the ascertainment of a permeation decrease with the coating of the bottle, the above described error however, does not manifest itself since it is canceled out. The improvement factor of permeation P, attained through a coating, is defined by the quotient:

$$K_v = \frac{P_{without\ coating}}{P_{with\ coating}}$$

Since herein applies $$K_v = \frac{V_3 \frac{\Delta p_{without\ coating}}{\Delta t_{without\ coating}}}{V_3 \frac{\Delta p_{with\ coating}}{\Delta t_{with\ coating}}}$$

applies, the variable $V_3$ is canceled out and for the improvement process now only $$K_v = \frac{\Delta p_{without\ coating} \cdot \Delta t_{with\ coating}}{\Delta t_{without\ coating} \cdot \Delta p_{with\ coating}}$$

remains.

Since the measuring intervals before and after coating were the same, or should have been the same, in order to be able to detect the actual improvement, the times are also canceled out such that for the improvement only the pressure ratio is critical:

$$K_v = \frac{\Delta p_{without\ coating}}{\Delta p_{with\ coating}}.$$

In the above described example the bottle was filled with $CO_2$ only after it had assumed the position depicted in FIG. 3. Hereby the course shown in FIG. 2 is generated.

It is, however, also possible to provide the bottle previously with an excess pressure and to allow it to rest in the closed state until the saturation of the bottle walls with the excess pressure gas is completed. If these two bottles already filled with excess pressure gas are now placed into the device according to FIG. 3 and if the container 21, 22 is slipped over it, in this case in the interspace 3 a pressure rate of ascent sets in immediately such as is depicted in FIG. 2 for the time span $t_3-t_2$. The further procedure can subsequently proceed in the same manner as in the procedure in which the bottles are only filled with gas after emplacement in the measuring device.

If for specific reasons it is not possible to keep the interspace between a bottle and the container encompassing it smaller than the content of the bottle, the invention can also be realized through a kinematic reversal. Herein the volume of the bottle would be smaller than the volume of the interspace, the pressure in the interspace would be higher than that in the bottle and the pressure measurements would be carried out in the bottle.

Since it is especially important to ascertain the gas permeability of a container rapidly, it is especially advantageous to utilize a gas with a higher permeation rate as the test gas instead of the gas for which a barrier protection effect is desired. If, for example, instead of $CO_2$, helium is utilized as the test gas, in the case of PET bottles measuring times of only a few hours result instead of, for example, 2 to 4 days. Since the correlation between the permeation of the test gas and the permeation of the gas to be used subsequently in the bottles or the containers is know or can be detected experimentally, it is possible to convert subsequently the numerical values ascertained with the gas of high permeation.

It is understood, that with the aid of software negative effects caused by strong temperature variations and saturation effects, are also automatically eliminated.

In a preferred embodiment, a device for the determination of the gas permeability of a container (1; 23, 24) with the volume $V_1$, has an enclosure (2; 21, 22) for the container (1; 23, 24). The enclosure (2; 21, 22) has a volume $V_2$. The device has a pressure measuring apparatus which measures the gas pressure in the container (1; 23, 24); a device for generating excess pressure in the space (3) between enclosure (2; 21, 22) and container (1; 23, 24) in comparison to the pressure in the container (1; 23, 24); a volume ratio far the volumes of container (1; 23, 24) and enclosure (2; 21, 22) for which the relation $V_2 - V_1 > V_1$ applying; and an apparatus which ascertains the gas permeability of the container (1; 23, 24) from the time course of the measured pressure.

What is claimed is:

1. A device for the determination of the gas permeability of a substantially rigid hollow body with the volume $V_1$, comprising:
    a substantially rigid container enclosing said hollow body, said container having the volume $V_2$ and a distance from said hollow body;
    a pressure measuring instrument which measures the gas pressure in the space between the container and the hollow body;
    an apparatus which ascertains the gas permeability of the hollow body from the time course of the measured pressure;
    gas supplying means for the generation of excess pressure in said hollow body in comparison to the pressure in the space between the hollow body and the container, whereby the pressure in said space between said hollow body and said container corresponds to atmospheric pressure at the beginning of the determination of the gas permeability; and
    a volume ratio for the volumes of the hollow body and the container for which the relation $V_2 - V_1 < V_1$ applies.

2. A device for the determination of the gas permeability of a substantially rigid hallow body with the volume $V_1$, comprising:
    a substantially rigid container enclosing said hollow body, said container having the volume $V_2$ and a distance from said hollow body;
    an apparatus which ascertains the gas permeability of the hollow body from the time course of the measured pressure;
    a pressure measuring apparatus which measures the gas pressure in said hollow body;
    gas supplying means for generating excess pressure in the space between said hollow body and said container in comparison to the pressure in the hollow body; and
    a volume ratio for the volumes of said hollow body and said container for which the relation $V_2 - V_1 < V_1$ applies.

3. The device as claimed in claim 1, wherein the pressure measuring element is disposed at any desired site between the container and the enclosure.

4. The device as claimed in claim 1, wherein the pressure measuring element is disposed outside of the enclosure and is connected via a channel with the interior volume of the enclosure.

5. The device as claimed in claim 1, wherein the volume between the inner wall of the enclosure and the outer wall of the container is as small as possible without hindering the emission of gas from the container.

6. The device as claimed in claim 1, wherein a heater to maintain the temperatures of the gas in the container and of the gas in the interspace between container and enclosure constant at a set temperature.

7. A device for the determination of the gas penetrability of a container with the volume $V_1$, comprising:
    an enclosure for the container with the enclosure having the volume $V_2$;
    a pressure measuring instrument which measures the gas pressure in the space between the enclosure and the container;
    gas supplying means for the generation of excess pressure in the container in comparison to the pressure in the space between the enclosure and the container;
    a volume ratio for the volumes of container and enclosure, for which the relation $V_2 - V_1 < V_1$ applies; and an apparatus which ascertains the gas permeability of the container from the time course of the measured pressure;
    wherein a body provided with an inner threading is provided, into which the outer threads of a container can be screwed.

8. The device as claimed in claim 1, wherein several devices for the determination of the gas permeability of a container are combined into one unit, which are covered with a hood.

9. The device as claimed in claim 8, wherein several units covered by a hood are disposed on a common cabinet.

10. The device as claimed in claim 9, further comprising a monitor with a computer.

11. The device as claimed in claim 1, further comprising a pressure measuring element is additionally disposed in the container.

12. A method for determining the gas permeability of a container comprising the steps of:
    encompassing the container with an enclosure to hermetically seal the container;
    bringing the space between the enclosure and the container to a set pressure; wherein the pressure in the container is brought by means of a test gas above the pressure in the enclosure;
    measuring the pressure in the interspace between the enclosure and the container over a set time period continuously or at specific time intervals; and
    detecting a value that exceeds a set threshold value of the pressure above the atmospheric pressure and storing the ascertained pressure value $p_2$ and time $t_2$ at which the pressure value $p_2$ occurs;

ascertaining a pressure value $p_3$ after a set time $t_3-t_2$ and the permeation $$P = V_3 \cdot \frac{p_3 - p_2}{t_3 - t_2} = V_3 \cdot \frac{\Delta p}{\Delta t}$$

is calculated.

13. A method for the determination of the gas permeability of a container comprising the steps of:
   exposing the container below a gas pressure which is above the pressure on the outside of the container;
   exposing the container for a set time to the pressure on its outside, with this time corresponding approximately to that time which must pass for the wall of the container to be saturated with the gas which is in the container;
   encompassing the container after the set time in an enclosure to hermetically encompass the container;
   bringing the space between enclosure end container to a set pressure;
   measuring the pressure in the interspace between enclosure and container over a set time period continuously or at specific time intervals;
   detecting the exceeding of a set threshold value of the pressure above the atmospheric pressure and storing pressure value $p_2$ as well as the time $t_2$ at which the pressure value $p_2$ occurs: and
   a pressure value $p_3$ after a set time $t_3-t_2$ is ascertained and the permeation $$P = V_3 \cdot \frac{p_3 - p_2}{t_3 - t_2} = V_3 \cdot \frac{\Delta p}{\Delta t}$$

is calculated.

14. A method as claimed in claim 12, wherein the set pressure in the space between enclosure and container at the beginning of the method is equal to the pressure of the ambient atmosphere.

15. A method as claimed in claim 13, wherein the set pressure in the space between enclosure and container at the beginning of the method is equal to the pressure of the ambient atmosphere.

16. A method as claimed in claim 14, wherein the pressure in the interspace between enclosure and container is measured by means of an absolute pressure measuring instrument.

17. A method as claimed in claim 13, wherein the pressure in the interspace between enclosure and container is measured by means of an absolute pressure measuring instrument.

* * * * *